Jan. 22, 1963 A. L. KERO 3,074,630
AXONOMETRIC COMPUTER AND PROCESS
Filed June 23, 1959 5 Sheets-Sheet 1

INVENTOR.
ARTHUR L. KERO
BY
Reynolds, Beach & Christensen
ATTORNEYS

Jan. 22, 1963  A. L. KERO  3,074,630
AXONOMETRIC COMPUTER AND PROCESS
Filed June 23, 1959  5 Sheets-Sheet 2

INVENTOR.
ARTHUR L. KERO
BY Reynolds, Beach & Christensen
ATTORNEYS

INVENTOR.
ARTHUR L. KERO
BY
Reynolds, Beach + Christensen
ATTORNEYS

Jan. 22, 1963  A. L. KERO  3,074,630
AXONOMETRIC COMPUTER AND PROCESS
Filed June 23, 1959 5 Sheets-Sheet 4

INVENTOR.
ARTHUR L. KERO
BY
Reynolds, Beach & Christensen
ATTORNEYS

Jan. 22, 1963 A. L. KERO 3,074,630
AXONOMETRIC COMPUTER AND PROCESS
Filed June 23, 1959 5 Sheets-Sheet 5
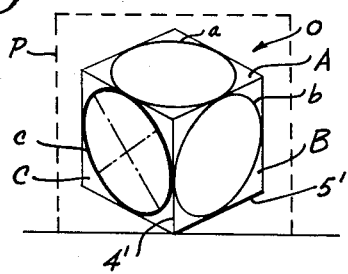
Fig. 11.
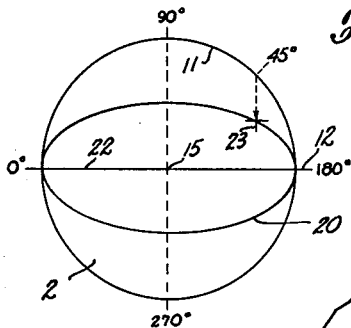
Fig. 12.
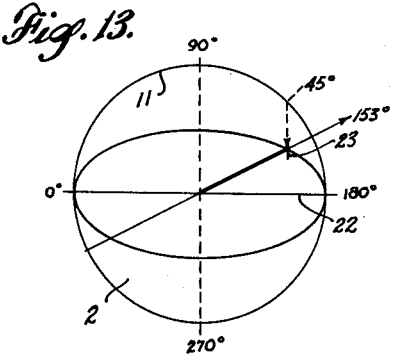
Fig. 13.
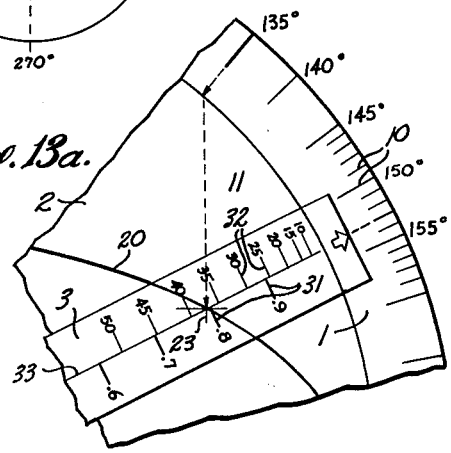
Fig. 13a.
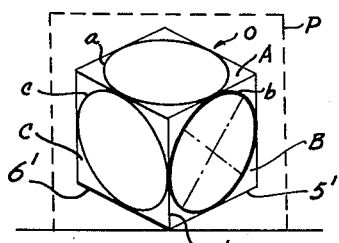
Fig. 14.
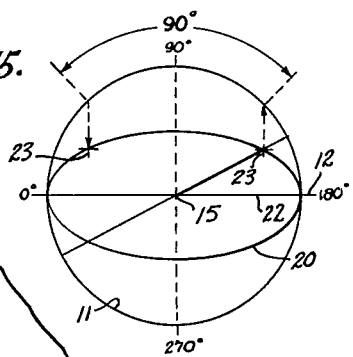
Fig. 15.
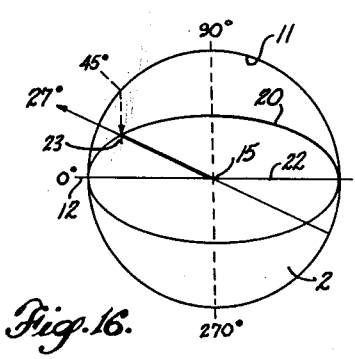
Fig. 16.
Fig. 16a.
INVENTOR.
ARTHUR L. KERO
BY
Reynolds, Beach + Christensen
ATTORNEYS க
United States Patent Office 3,074,630
Patented Jan. 22, 1963

3,074,630
AXONOMETRIC COMPUTER AND PROCESS
Arthur L. Kero, Seattle, Wash., assignor to Boeing Airplane Company, Seattle, Wash., a corporation of Delaware
Filed June 23, 1959, Ser. No. 822,299
4 Claims. (Cl. 235—61)

This invention deals with the draftsman's art. It provides him with a tool and a method by the use of which he can draw an object, even one quite irregular in shape, in axonometric projection. In axonometric projection, more especially in trimetric projections, which is a special case, all distances are foreshortened and all angles are distorted. Nevertheless, all parts of proper axonometric projections are drawn in proportion to all other parts. The tool of this invention is in the natue of a computer whereby the correct proportions of the plane projections of lines and angles in space, with relation to other such lines and angles, can be accurately determined. Thereby the draftsman is enabled to draw the object on the picture plane, regardless of its attitude in space or relative to the picture plane, in accurate proportion. Conversely, having such an accurately proportioned axonometric projection, there can be scaled therefrom the true distances and angles of the object. The net result is the ability to illustrate accurately in a single axonometric projection, and to use that projection for scaling off, that which otherwise would require three different orthographic projections, and this despite great complexity or irregularity in the projected object, or the inclination of the line of sight to the object.

Conventional engineering drawings are orthographic projections with a plan view, a front view and a side view. If the three views of a cube were shown in orthographic projections the front, side, and plan views would each appear as a square. The lines would appear in their true proportionate (in this case, equal) lengths, and the angles would be of true magnitude, i.e., all would be right angles. In drawing complex mechanical assemblies for illustration, with tubing and other parts, it is often desirable to draw the three views in one projection, so that it may be more clearly seen how each part is disposed within the assembly. A picture so drawn is called an axonometric projection. An isometric projection is a special case of axonometric projection, others being dimetric and trimetric projections. The difficult part of an axonometric projection is that the lines do not appear in their true proportionate length, angles do not appear in their true magnitude, and figures are distorted from their true shape. If a cube were shown axonometrically, three cube faces would all appear in the same picture. But even though all margins of all sides of the cube are in reality equal and all the angles are in reality right angles, the side margins would probably be drawn at the picture plane in different lengths, and angles would be drawn as other than right angles. A circle drawn on the side of a cube would appear as an ellipse. A square side would appear as a parallelogram. Again, if the cube were to be rotated in space, about a horizontal or a vertical axis, or both, into a new position, the side margins at the picture plane would change in length and the angles would change in magnitude. The old method of constructing an axonometric drawing involved several steps of using proportional triangles, ellipse tables, dividers, ruler, and protractor. Construction lines representing each different plane illustrated must be drawn on a piece of work paper and several mechanical steps must be performed to obtain the apparent length of lines and magnitude of the angles. To obtain actual dimensions and angles by scaling off an axonometric projection entails a tedious reversal of such steps. My invention reduces the time and labor of the old method by as much as two thirds.

Therefore, the primary object of my invention is to provide a simple and speedy means and method to make axonometric projections from orthographic projections or from actual physical dimensions, or conversely, to enable the determination of true values of lines and angles which are shown axonometrically.

More especially, it is an object to determine the apparent length and proper direction of a line at the picture plane when the object is drawn axonometrically, and the converse, or the apparent angularity and location of two lines when drawn axonometrically, and the converse, regardless of the rotated positions of such lines in space and relative to the picture plane.

Another object is to determine the direction and angle of the axes of an ellipse, which represents a circle, and the lengths of such axes, in an axonometric drawing.

The invention is represented in the accompanying drawings in a single representative and practical form, and will be described with particular reference to that form, but it will be understood that this form is given by way of example, and not of limitation, and no restriction is to be implied from the use of the single exemplary form, other than as appears clearly in the appended claims. Also, for ease of explanation, a cube in a given attitude will be taken as the object to be illustrated axonometrically, and the extension of the principles illustrated to more complex shapes, and to other attitudes, will be clear from the principles so illustrated, and described herein.

FIGURE 1 is a plan view of the assembled computer.

FIGURES 2, 3, and 4 are plan views of the three individual components of the computer, the protractor, the disk, and the scaling arm, respectively, and FIGURE 5 is an enlarged detail of a part of the scaling arm.

These FIGURES 6a to 8a illustrate the progression of separate steps from a true orthographic projection to an axonometric projection. The remaining views are to illustrate the usage of the computer of this invention in arriving more directly at the correct distances and angles in the axonometric projection.

Figure 9:
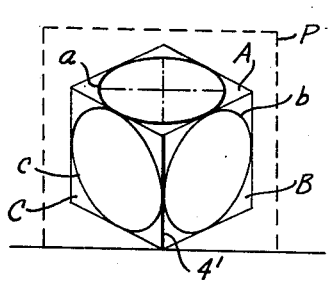
Figure 10A:
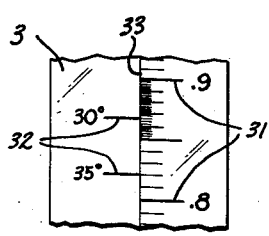
Figure 10:
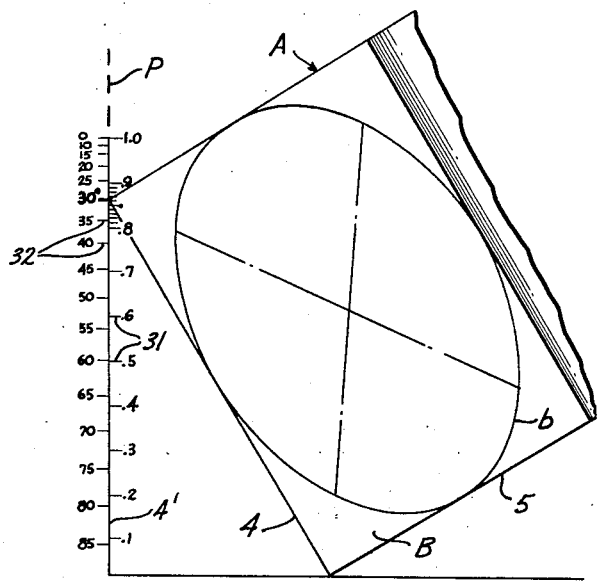

FIGURE 9 illustrates the cube in its assumed final attitude, and coupled with enlarged FIGURE 10, and with further enlarged FIGURE 10a, shows how the apparent length in axonometric projection of a single line of the cube is arrived at.

FIGURE 11 is like FIGURE 9, and coupled with diagrammatic FIGURES 12 and 13, and enlarged detail FIGURE 13a, shows how the direction of an apparent length in axonometric projection of a second line of the cube is arrived at.

FIGURE 14 is like FIGURES 9 and 11, and coupled with diagrammatic FIGURES 15 and 16, and enlarged detail FIGURE 16a, shows how the direction and apparent length in axonometric projection of a third line of the cube in arrived at.

Understanding of the invention and its underlying principles will best be promoted by describing the several components and their structural relationships, and then by following through the solution of a typical problem or problems in producing an axonometric projection of a cube, step by step, to illustrate how the computer functions, and to make clear the method which is part of the invention. Finally, the use of a proper anoxometric projection in scaling off correct distances and angles will be explained.

Figure 1:
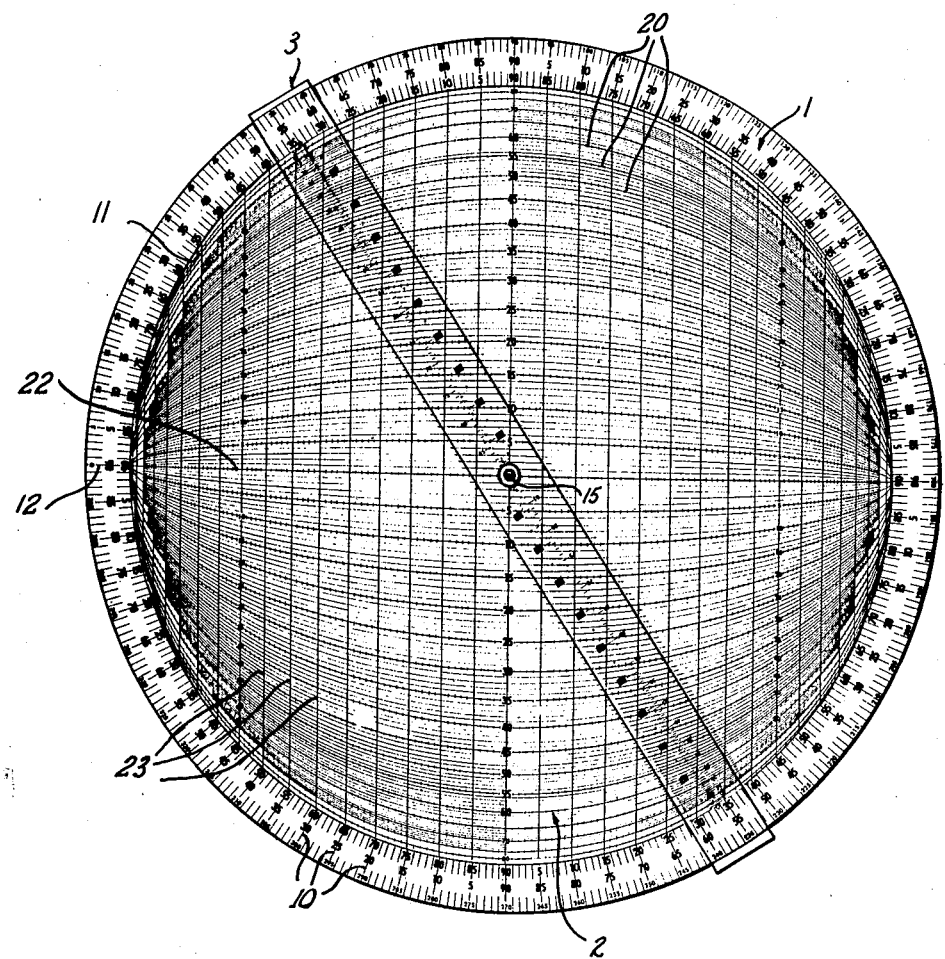
Figure 2:
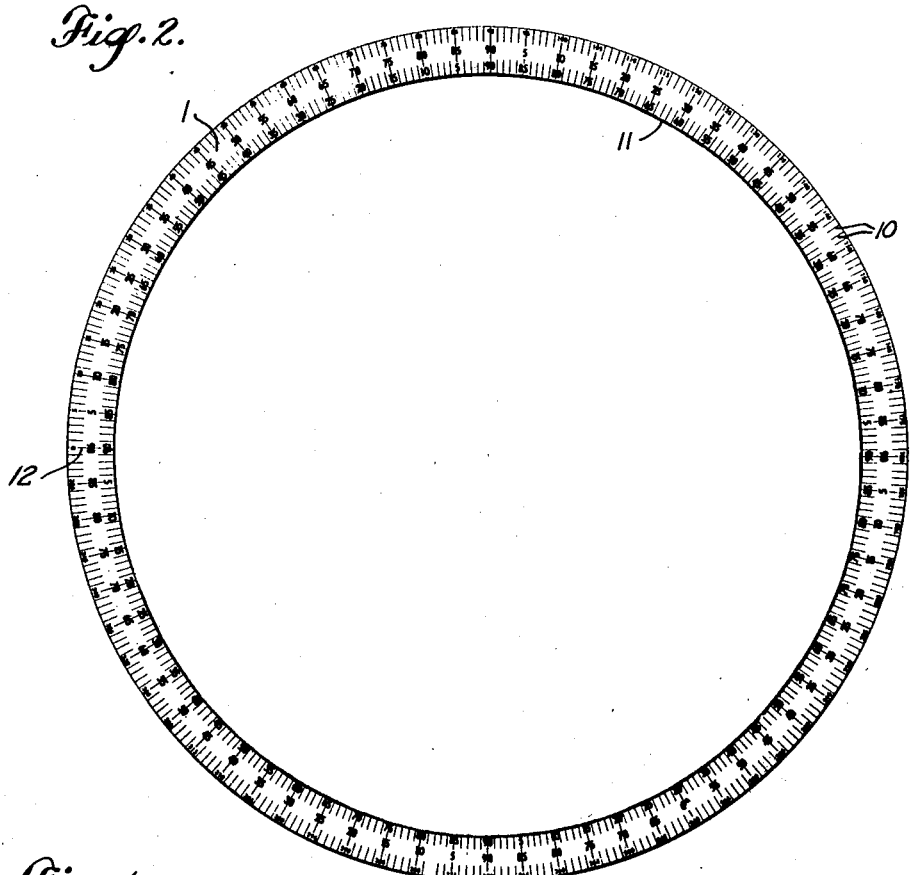
Figure 4:
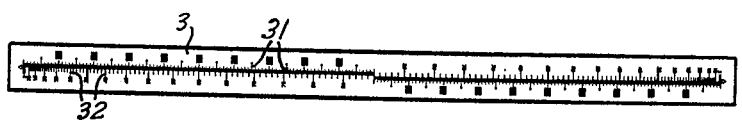
Figure 5:
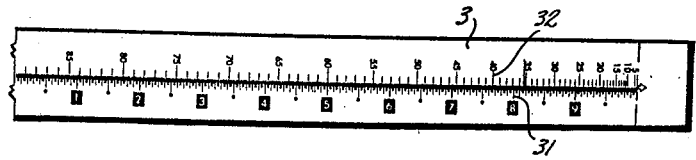
Figure 3:
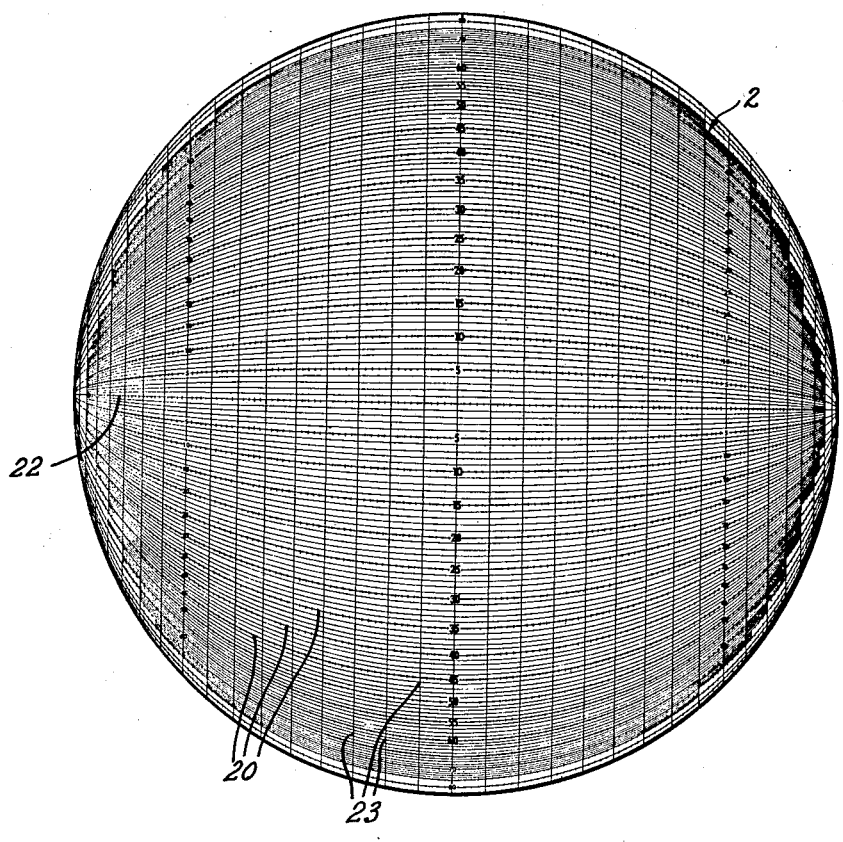

Physically the computer comprises three flat components of no appreciable thickness, i.e., (I) a completely circular (360°) protractor 1 having equiangularly spaced scale marking 10 about its circle 11; one diameter of the protractor, designated its major axis 12, is always to be horizontal in use; (II) a circular disk 2 diametrically and circumferentially coincident with and mounted for rotation concentrically of the protractor; this disk bears graduated ellipses 20 representing angularly tilted positions of the protractor circle 11, all of the major axes 22 of which ellipses coincide with one another, and in one rotated position coincide with the major axis 12 of the protractor; and (III) a scaling arm 3, usually but not necessarily mounted for rotation about the center 15 of the protractor, relative to each of the protractor 1 and disk 2, and bearing two sets of scale markings along radial lines, the markings 31 in one of which sets are at regular intervals representing fractional values of the length of a radius of the protractor circle, and the markings 32 in the other set being spaced at distances representing cosines (although they could represent sines) of angles at which the circles represented by the ellipses are tilted. All three of these parts are of minimal thickness. The scaling arm 3 conveniently is transparent. The disk 2 also conveniently bears reference lines 23 directed at right angles the major axis 22 through points on each ellipse which correspond to the intersection of equiangularly spaced radii of the circle represented by such ellipse 20 with the circumference of that circle. Their intersections with the major axis 22 therefore represent cosines of the angles of such radii relative to the axis 22. The computer as assembled for use is shown in FIGURE 1, and the several components are separately shown in FIGURES 2, 3, and 4.

Figure 6A:
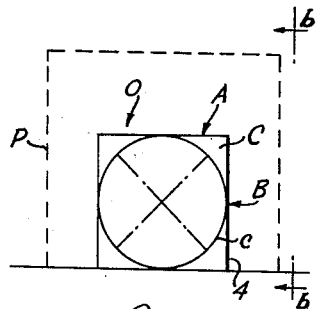
FIGURE 6a is an orthographic front elevation, and FIGURE 6b a like side elevation, of a cube which is to be changed in attitude and then drawn in axonometric projection.
Figure 7A:
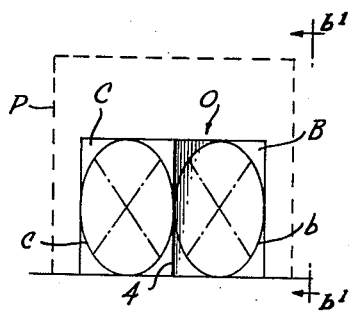
FIGURE 7a is an orthographic front elevation, and FIGURE 7b a like side elevation, of the cube rotated 45° from its attitude in the preceding views.
Figure 8A:
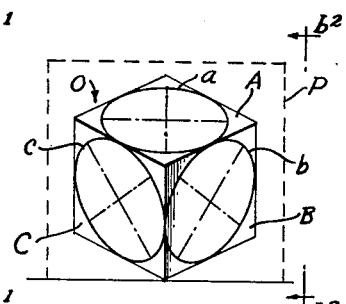
FIGURE 8a is an orthographic front elevation (actually now an axonometric projection), and FIGURE 8b an orthographic side elevation of the same cube, now tilted 30° from its attitude in FIGURES 7a and 7b.
Figure 6B:
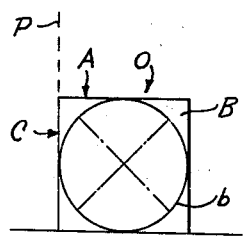
Figure 7B:
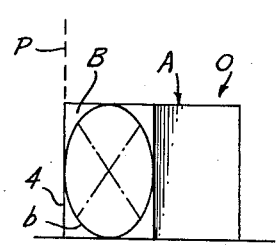
Figure 8B:
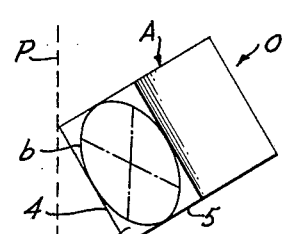

The use of the invention can be illustrated by following through a simple but typical problem involving the showing in axonometric projection of a cube rotated 45° relative to the picture plane and tilted 30° relative to that picture plane. The cube O, with its faces A, B, and C (and like faces parallel to each of the same) all at right angles to each other, and bearing the respective circles $a$, $b$, and $c$, is shown non-rotative and non-tilted relative to and in orthographic front elevation with respect to a picture plane P in FIGURE 6a; FIGURE 6b is a side elevational view of the same, from the viewpoint illustrated in FIGURE 6a by the line $b$—$b$, showing the picture plane P in edge view, as a line. In FIGURE 6a the face C and its circle $c$ are of full size, and the angles of face C are undistorted right angles, but faces A and B are mere lines, as are their circles $a$ and $b$. In FIGURE 6b the face B and its circle $b$ are undistorted, and faces A and C appear as lines only.

Now assume that the cube is rotated 45° about edge 4 common to faces B and C with respect to picture plane P. Now in orthographic projection faces B and C show equally, but foreshortened laterally in front elevation, as in FIGURE 7a, and their circles $b$ and $c$ appear as ellipses. The line 4 is of full size, and the face A, whether viewed in front elevation (FIGURE 7a) or in side elevation (FIGURE 7b) from the viewpoint $b'$—$b'$ of FIGURE 7a, still is shown as a line. Such views are readily projected from an orthographic plan view of the rotated cube.

Now assume further that the cube O is tilted 30° towards the picture plane P. All three of its faces A, B, and C, now appear in a single front elevational view, FIGURE 8a, which can be projected orthographically from a side elevational view 8b of the cube tilted into the assumed position, as viewed from the viewpoint represented by the line $b^{2'}$—$b^2$ of FIGURE 8a. Each ellipse $a$, $b$, $c$, is different in shape and direction of its axes from the ellipses of FIGURES 7a and 7b.

It can be seen that it is possible to project orthographically a cube or other object which is both rotated and tilted, but it requires several steps to accomplish this, and a reversal of these several steps would be needed to scale off true dimensions from a final view, with the always-present likelihood of error in one or more such steps, leading to erroneous scaling off of the true dimensions and angles, especially if the angles of tilt and of rotation are not known, wherefore such orthographically drawn views have not been considered reliable. By the present invention the true axonometric projection can be produced directly, if the angles of tilt and of rotation are given, and from the axonometric projection can be determined directly the true length and direction of lines, even though the angles of tilt and of rotation are unknown.

Assume, as before, that it is desired to show, in true axonometric projection, a cube rotated 45° and tilted 30°, and bearing upon its faces A, B, and C the circles $a$, $b$, and $c$, respectively. Knowing that the edge 4 is tilted 30° relative to the picture plane P, the first determination is the apparent length at picture plane P of line 4'. As FIGURE 10 shows, and taking the length of line 4 as unity, the line 4 at an angle of 30° to the picture plane P subtends a distance 4' at the picture plane which is the cosine of 30°. The scaling arm 3 bears a scale 32 the markings whereof are spaced according to cosines, hence by observing the 30° mark on scale 32, and reading on the opposite scale 31 (see FIGURE 10a) the ratio between the length of the cosine of 30° and the true length of the untilted line 4, it is determined that the cosine is 0.866 of the true length; accordingly the line 4' at the picture plane P is 0.866 of the length of line 4. Knowing the length of line 4 and its angle of tilt, its apparent length 4' at the picture plane (and the apparent length of all lines parallel to it) is determinable directly merely by use of the scales 31, 32. The line 4' can now be drawn of correct length, and since it is not, by assumption, rotated relative to the vertical at the picture plane, also in the correct direction.

Next it is desired to determine the correct direction and length of line 5', knowing the true length (unity) of line 5 and the inclination (30°) of the plane in which it lies, and the angle of rotation (45°) of line 5 relative to the picture plane P. The disk 2 is located with its major axis 22 coincident with the major axis 12 of the protractor 1, and since the face A (and the parallel opposite face of which 5 is one edge) is tilted 30°, the ellipse 20 of 30° is selected for use. The cube having been rotated 45°, a line 23 is projected from the 45° mark on protractor scale 10 to the 30° ellipse 20; the intersection of the ellipse and selected line 23 is seen in FIGURES 12, 13, and 13a. Now scaling arm 3, centered at 15, is extended through this intersection, and itself intersects protractor scale 10 at a reading of 153°; see FIGURE 13a. This angular reading gives the direction of line 5', and the reading at the intersection of scale 31 with the 30° ellipse, namely 0.79, gives directly the ratio of the apparent length of line 5' to the actual length of line 5. The intersection of line 23, projected from the 45° (rotational) reading of protractor scale 10, with each of the ellipses 20 is the locus of the distant end of line 5 as projected upon the picture plane P. Now the line 5' and all lines parallel thereto can be drawn in correct apparent length and at the correct angle.

Finally the direction and length of line 6', as the projection of the cube's edge at right angles to edge 5, is to be determined. Since the selected ellipse 20 already represents the tilt angle (30°) of the cube, and the line 23 from the rotation angle (45°) of the cube to its intersection with the selected ellipse 20 is the same at the opposite side of the cube, it is only necessary to project line 23 at the opposite side of the scale 10 to the same ellipse 20, and as before the readings as determined by scaling arm 3 are an angle of 27° (the complement of 153°) and a length ratio of 0.79, as before. This gives the direction of line 6′, and its length. The object selected for illustration being a cube, and having been rotated 45°, its actual length is identical with the apparent length of line 5′, but if the object were non-cubical, or were rotated to some different angle, the lengths 5′ and 6′ would differ, but would still be accurately determinable by the same procedure. Now the line 6′ and all lines parallel thereto can be drawn in correct apparent length and at the correct angle, and the cube has been completed.

The circles a, b, and c appear as ellipses. The diameter of the actual circle is equal to the true length of any edge of the cube, but by reason of the rotation of the cube, or its rotation and tilt combined, is oriented diagonally of its face in one direction, and the minor axis is diagonally opposite. The ellipse a on face A has been determined to be a 30° ellipse, corresponding to the angle of tilt of that face. The faces B and C however are each both tilted and rotated. Since the scale 32 represents the cosines of angles of tilt of the ellipses, the ellipse on face B has been determined to be a 38° ellipse, by reading on scale 32 opposite the 0.79 reading on scale 31 (where line 23 intersects the scaling arm's line 33), and so by rotating disk 2 so that its minor axis is at 38° to the major axis 12 of the protractor, the 30° ellipse on disk 2 is correctly oriented relative to face B. The ellipse and its orientation relative to face C are similarly determined.

If it were desired now to tilt the object, say about line 6′ by a further given angular amount, the problem can be solved by setting the computer to simulate the plane. Thus the scaling arm 3 is placed in a known position as a reference position. From the projection 23 of the ellipse—say the 38° ellipse 20 of and oriented as in the preceding solution—to the protractor scale 10 count over the scale 10 by the angle of further tilt—say 15°—and then project back to the ellipse along another line 23 to locate the intersection of the simulated line—the scaling arm 3—and the 38° ellipse plane. Now the scaling arm is moved to the new point of intersection, and the angle and apparent length of the new line is read off the scales 32, 31.

Actually this problem can be resolved down to one step, which is to find the proportionate length and apparent direction of line 4′ when rotated about line 6′ by the prescribed angular amount. Line 4′ lies in the plane defined by ellipse b. Therefore, since line 4′ rotates about line 6′, line 4′ rotates in the plane of ellipse b, and this ellipse does not change, except in orientation. The first motion is to move the disk 2 to a rotated position so that the minor axis 22 of the disk 2 is parallel to the apparent direction of line 6′, i.e., 27°. It has already been ascertained by previous steps of the problem that the ellipse b is a 38° ellipse. In this position, the 38° ellipse with its minor axis pointing toward 27° simulates the plane of the ellipse b. Place the scaling arm 3 with the line indicating means pointing in the apparent direction of line 4′, i.e., 90°, straight up. Ascertain the point at which the indicating line crosses the 38° ellipse. This point of intersection will read 0.866 on the linear scale 31, which 0.866 value is the apparent length of line 4′ before rotation. Determine the reference line 23 which passes through the point of intersection of the 38° ellipse and the scale arm's indicating line. Follow this reference line 23 upwards to the left until the reference line 23 ends on an angular marking 10 on the true circle 11, indicating a value of 78° on the angular markings 10 of the true circle 11. Since the line 4′ is to be rotated through a true angle of 15°, subtract 15° from the 78° value on the protractor 1, which gives a value of 63°. Ascertain a second reference line 23 which strikes the 63° angular marking and follow this second reference line 23 toward the major axis 22 until the second reference line 23 crosses the 38° ellipse.

Now place the scaling arm 3 so that its indicating line passes over this new point of intersection of the second reference line 23. The indicating line now points to a value of 76° on the angular markings 10, which 76° value indicates the new apparent direction of the line 4′. The new point of intersection gives a reading of 0.76 on the linear scale 31, which 0.76 value is the new apparent proportional length of line 4′. With the direction and length of line 4′ ascertained, since the opposite edge of the cube remains parallel to line 4′, the drawing of the cube in its further rotated position may easily be constructed.

In this manner, by establishing the ellipse 20 of a plane in which a line is to be rotated and projecting this line out to the true angular markings 10, performing the rotation on the true angular markings 10 and projecting back to the ellipse 20, the new apparent direction and length of any line may be ascertained.

I shall now discuss some of the basic uses of the axonometer most of which were in the previous problems, but I will tie each step more closely to the stated functions of the component parts of the axonometer.

Assume this problem situation. Two lines are shown in an axonometric drawing, so that the apparent length and apparent direction are known. The plane containing these two lines is known, and therefore, the angle and minor and major axes of the ellipse which define the plane which includes the two axonometric lines are known. It is desired to find the true angle formed by the two lines. The problem will be solved in this manner. Each line will be rotated into a true circle so that its true direction and true length are seen. With the two lines which are the two sides of the angle thus defined, the angle contained by those two lines is indicated on the protractor 1.

The first step is, of course, to place the disk 2 so that the minor axis on the disk or ellipse chart 2 is parallel to the direction of the motor axis of the plane-defining ellipse of the axonometric drawing. This first step is done so that an ellipse 20 on the ellipse chart 2 can function to simulate a true circle whose plane is rotated so that the true circle appears as an ellipse. Next, place the scaling arm 3 so the indicating line thereof points in the direction of one of the axonometric lines, thereby cooperating with the protractor 1 in functioning to simulate the apparent direction of an axonometric line (i.e., a line whose apparent direction and length are shown). Then ascertain the point at which the indicating line crosses the ellipse 20 on the ellipse chart 2, which ellipse 20 functions to define the angle and direction of the plane which contains the two axonometric lines. The indicating line now defines one side of the apparent angle. The distance from this point of intersection to the center 15 is the apparent proportionate distance, so that the linear scale markings 31 function to indicate the apparent proportionate length. The reference line 23 which passes through this point of intersection on the ellipse 20 and the indicating line functions to project this point of intersection out to the true circle 11, thereby functioning to relate the apparent length and direction of the line to the true length and direction of the line, since, when the axonometric line is seen on the true circle 11, its true length and true direction are now seen. Repeat the same process for the other axonometric line which forms the other side of the apparent angle. Next, ascertain where this second axonometric line crosses the plane defining ellipse 20. Then project this second point of intersection along a second reference line 23 out to the true circle 11. Now the true direction and true length of this second line will be known. With the true direction of the first and second lines known, the true angle may be ascertained merely by reading the angular measurements on the angular markings 10 of the protractor 1, so that the scaling arm 3 functions to indicate the sides of the true angle, as it did the apparent angle, and the protractor 1 functions to indicate the true angle.

Assume a second problem situation where it is desired to perform the reverse of the above operation, i.e., to find the apparent angle made by two intersecting lines and the apparent length and direction of these two lines, where the plane containing these two lines is rotated to a new plane not at right angles to the line of sight.

This is a typical proble in axonometric drawing. This consists in merely taking two intersecting lines from an orthographic drawing and putting these same two lines on an axonometric drawing, by rotating each line into a new plane, so as to show the apparent length and direction of the lines in the axonometric drawing. If the plane containing the two lines is to be rotated 70° from the plane of the true circle, a circle on this newly rotated plane will appear as a 20° ellipse. If the plane is to be rotated 80° from the plane of the true circle, a circle on this newly rotated plane will appear as a 10° ellipse. If it is desired to find the apparent length and apparent direction of the two axonometric lines in a new plane, and the apparent included angle, ascertain the points at which the two lines, in the plane of the true circle 11, intersect the true circle 11. This is done by placing the line indicating means of the scaling arm in a direction of one of the lines so as to indicate on the protractor 1 the line's true direction. From this point of intersection on the circle 11, follow down along the reference lines 23 until the reference lines 23 intersect the ellipse 20 which defines the newly rotated plane, i.e., an ellipse whose angle is the same as the plane, and whose minor axis is parallel to a line perpendicular to the plane. A line, extending from the intersection of the reference line 23 with the ellipse 20, to the center 15, will define the new direction and new proportionate length of the line. Place the line indicating means so as to run through this point of intersection on the ellipse 20. The second line is determined in the same manner by defining a line from the second point of intersection of the other reference line 23 with the ellipse 20, to the center point 15. These two lines define the sides of the apparent angle as seen axonometrically.

In this operation, the components of the computer have performed exactly the same functions as in the immediately previous example, but in the reverse order. The ellipse 20 defines the true circle 11 in the new plane, thereby defining the plane into which the lines are rotated. The reference lines 23 relate the points on the true circle 11 to the ellipse 20 so that the two lines which are the sides of the angle are rotated into the ellipse 20 of the newly rotated plane. The line indicating means cooperates to define the apparent direction of the angle sides, and the linear markings 31 function to define the proportional length.

Assume another problem situation. The apparent direction and the apparent proportionate length of a line is known and it is desired to ascertain the minor axes and ellipse which defines a plane perpendicular to that line. The apparent direction of the line which may be indicated by the indicating line of the scaling arm 3 is the direction of the minor axis of the ellipse. The angle of the ellipse is the angle whose cosine is the proportionate length of the line. These figures may be obtained directly from the cosine scale 32 and the linear markings 31 of the scaling arm 3. Therefore the indicating line, the cosine scale 32, and the linear marknigs 31 all cooperate to define a plane, by defining the direction and angle of an ellipse contained in a plane.

Assume another problem situation where a line is rotated in a circular path but the circle, which is the locus of a point on a line, is at an angle and appears as an ellipse. When a line is rotated in a circle and the circle is seen as a true circle, the line appears to have a constant angular velocity and constant length. When a line which is the radius of a circle is rotated in a circle which lies entirely in the plane of vision of the viewer so that the circle itself appears as a straight line, the rotating line has no apparent angular motion and appears merely to change its length so that any point on the line describes a path known as simple harmonic motion. However, when a line is rotated on a circle which appears to the viewer as an ellipse, the rate of apparent angular change varies, and the apparent length of the line varies. By means of the axonometric computer, it is a simple matter to ascertain the apparent amount of rotation of a line and the apparent proportionate length of a line, if the angle and direction of the ellipse are known and the amount of true rotation of the line is known. This is accomplished by determining the present position of the axonometric line (which is a line seen in its apparent length and apparent direction) and placing the line indicating means of the scaling arm 3 in a direction so as to function to simulate the apparent direction of the axonometric line. Since the angle of the ellipse is known, ascertain the point at which the indicating line crosses the ellipse 20 on the ellipse chart 2, which ellipse 20 corresponds to the angle of the plane which contains the axonometric line, and which functions to simulate the plane defining the line, and which ellipse 20 functions to define the locus of a point rotated about the center 15 in the plane of the ellipse. From this point of intersection, follow along the reference line 23 to the angular markings 10 on the true circle 11. This angular measurement, whatever it may be, represents the true direction of the axonometric line. If the axonometric line is to be rotated a certain angular distance, move this angular distance along the true circle 11, which angular movement gives the true angular rotation. To find the apparent angular rotation from this second point on the true circle 11, follow along the reference line 23 back down to the ellipse 20 and ascertain the second point of ellipse intersection. Place the indicating line on this new second point of ellipse intersection to function to indicate the apparent direction of the newly rotated line. The indicating line now shows the apparent rotation and apparent direction of the line, and the linear markings 31 function to indicate the new apparent proportionate length of the line. By comparing this new location and length of the indicating line with the previous location and length of the indicating line, the apparent rotation and the apparent change in proportionate length may be ascertained.

In summary, the protractor 1 always shows true angularity, either of true lines or of apparent lines. The true circle 11 is always a picture of an ellipse 20 when the ellipse is rotated to a plane perpendicular to a line of sight. The reference lines 23 coordinate the ellipse 20 with the true circle 11. When a point on the ellipse 20 is rotated to the true circle 11, it describes a path indicated by reference line 23. The major axis 22 of the ellipse 20 is always the true diameter of the circle, and the axis of rotation of the ellipse. The minor axis of the ellipse 20 gives the direction of a line drawn perpendicular to a plane which contains the ellipse 20. The scaling arm 3 by means of the indicating line simulates the direction, whether this be true direction or the apparent direction of the line. The linear markings 31 give the apparent proportionate length of a line. Therefore, the indicating line and the linear markings 31 cooperate with the reference lines 23 and the ellipse 20 to give the proportionate length and the apparent direction of any axonometric line. The cosine scale 32 functions to cooperate with the linear markings 31 and with the ellipse 20 so that a plane perpendicular to a line may be ascertained, by ascertaining the minor axis and angle of an ellipse which lies in a plane perpendicular to this line.

I claim as my invention:

1. A drafting computer for axonometric drawings, comprising a circular protractor having equiangularly spaced markings about its circle, and one diameter whereof, designated the major axis, in use is horizontal; a disk circumferentially coincident with and mounted concentrically of and rotatable with relation to the circle of said protractor, said disk bearing ellipses all of whose major axes are coincident with one another and with the major axis of the protractor, the respective ellipses then corresponding to the locus of the protractor circle when titled about its major axis into each of a plurality of given tilted positions; and a scaling arm which in use is centered at and positionable at various angles about the center of the protractor, for extension at any selected angle thereon about the center and relative to the disk, said scaling arm bearing a linear scale with a first set of scale markings at regular intervals representing fractional values of the radius of the protractor's circle, for reference to the intersection of such scale with a selected ellipse on the disk; the disk bearing also reference lines intersecting the several ellipses at right angles to the major axis and extending to the protractor's circle, and spaced at intervals along the disk's major axis representing the intersection of equiangularly spaced radii of the circle represented by such ellipse with the circumference of that circle.

2. A drafting computer as in claim 1, wherein the scaling arm bears a second set of scale markings representing trigonometrical values related to the apparent angle at the picture plane of a line in spaced disposed at an angle to such picture plane.

3. A draft computer as in claim 2, wherein the second set of scale markings represents the cosine values of the apparent angle of the line in space.

4. A drafting computer for axonometric drawings, comprising a fixedly positioned protractor having a reference circle of 360°, divided by markings representing equal angles about its center, one diameter of such circle being designated its major axis, and in use being disposed horizontally; a circular disk mounted concentrically of and rotatably with respect to said protractor, the circumference whereof coincides with the protractor's reference circle, said disk bearing ellipses with coincident major and minor axes, respectively, the several ellipses representing the loci of the edge of the disk circle when tilted about the disk's major axis by different angular values, ranging from the plane of the disk to a plane a right angles thereto, each ellipse bearing appropriate identification of its angle of tilt; each ellipse also bearing reference line markings extending at right angles to the major axis and spaced to represent the intersection with the disk circle represented by each given ellipse of equiangularly spaced radii of such circle; and a scaling arm which in use is centered at and rotatable about the center of the protractor circle and disk, and said scaling arm bearing a first and a second set of scale markings along a common radius, constituting a line indicating means, the first set representing equidistant fractional parts of the radius of the disk and protractor circles, and the markings in the second set being spaced according to the relationship of a trigonometrical function such as the cosine, of the apparent angle at the picture plane of lines in space which are inclined at angles of three coordinates relative to such picture plane.

References Cited in the file of this patent
UNITED STATES PATENTS

| | | |
|---|---|---|
| 2,531,932 | Brown | Nov. 28, 1950 |
| 2,622,326 | Boehm | Dec. 23, 1952 |
| 2,851,778 | Ross | Sept. 16, 1958 |